United States Patent
Wang

[11] Patent Number: 5,496,447
[45] Date of Patent: Mar. 5, 1996

[54] WATER DISTILLING APPARATUS

[76] Inventor: Chin-Tu Wang, No. 1, Alley 6, Lane 244, Hsin Shu Rd., Hsinchuang City, Taipei Hsien, Taiwan

[21] Appl. No.: 402,538

[22] Filed: Mar. 10, 1995

[51] Int. Cl.[6] .................................. B01D 3/42; C02F 1/04
[52] U.S. Cl. ................... 202/180; 202/181; 202/185.3; 202/190; 202/196; 202/202; 202/206; 203/1; 203/10; 203/99; 203/100; 203/DIG. 17; 203/DIG. 22; 422/106; 422/117
[58] Field of Search ............... 203/10, 11, DIG. 22, 203/DIG. 17, 1, 99, DIG. 16, 100; 202/181, 206, 234, 180, 202, 176, 177, 190, 193, 192, 195, 196; 422/2, 117, 41, 101, 106

[56] References Cited

U.S. PATENT DOCUMENTS

| | | | |
|---|---|---|---|
| 565,686 | 8/1896 | McCabe | 203/DIG. 17 |
| 577,267 | 2/1897 | Painter | 203/DIG. 17 |
| 718,991 | 1/1903 | Ellison | 203/DIG. 17 |
| 4,339,307 | 7/1982 | Ellis | 203/DIG. 22 |
| 4,687,550 | 8/1987 | Wong | 202/196 |
| 4,724,044 | 2/1988 | Weishaar et al. | 203/10 |
| 4,888,097 | 12/1989 | Palmer et al. | 202/206 |
| 5,110,419 | 5/1992 | Weber et al. | 202/202 |
| 5,286,350 | 2/1994 | Huang | 202/202 |
| 5,290,402 | 3/1994 | Tsai | 202/206 |
| 5,314,586 | 5/1994 | Chen | 202/202 |

Primary Examiner—Wilbur Bascomb, Jr.
Attorney, Agent, or Firm—Bacon & Thomas

[57] ABSTRACT

A distilling apparatus for distillation of water, including a condensing chamber divided into an upper holding space for receiving water from a water source and a lower holding chamber for condensing steam into water, a heating chamber controlled to heat water from the upper holding space into steam and having a steam outlet connected to the lower holding space for guiding steam into the lower holding space for condensing, a hot water chamber, which receives condensed water from the lower holding space of the condensing chamber, and a cold water chamber, which receives distilled water from the hot water chamber and cools it down by an electronic cooler.

3 Claims, 2 Drawing Sheets

5,496,447

WATER DISTILLING APPARATUS

BACKGROUND OF THE INVENTION

The present invention relates to a distilling apparatus for the production of distilled water which is simple and easy to maintain.

The techniques of using a distilling process to produce distilled water have been well known. Regular distilling process for the production of distilled water commonly comprises the step of using a water supply container to supply water, the step of using a boiling container to heat water from the water supply container into steam, the step of using a heating container to heat primarily distilled water from the boiling container into steam, and the step of guiding the steam from the heating container through a water container for a primary condensing and then permitting condensed water to be guided to a cold water container through a coil pipe. Distilled water gathered in the cold water container can then be used for drinking. The apparatus for the aforesaid distilling process is complicated, and therefore the maintenance work of the apparatus is difficult. Furthermore, because two electric heaters are used the cost of the apparatus is high and, much power supply is consumed during the distilling process.

SUMMARY OF THE INVENTION

The present invention provides a distilling apparatus for the production of distilled watery which eliminates the aforesaid drawbacks. According to one aspect of the present invention, the distilling apparatus comprises a condensing chamber divided into an upper holding space for receiving water from a water source and a lower holding chamber for condensing steam into water, a heating chamber controlled to heat water from the upper holding space into steam and having a steam outlet connected to the lower holding space for guiding steam into the lower holding space for condensing, a hot water chamber, which receives condensed water from the lower holding space of the condensing chamber, and a cold water chamber, which receives distilled water from the hot water chamber and cools it down by an electronic cooler.

According to another aspect of the present invention, an electronic cooler is used to cool down distilled water in the cold water chamber for drinking.

According to still another aspect of the present invention, a small amount of water can be filled into the apparatus and then completely boiled into steam to sterilize the pipings and all chambers of the apparatus.

DETAILED DESCRIPTION OF THE PREFERRED EMBODIMENT

Figure 1:
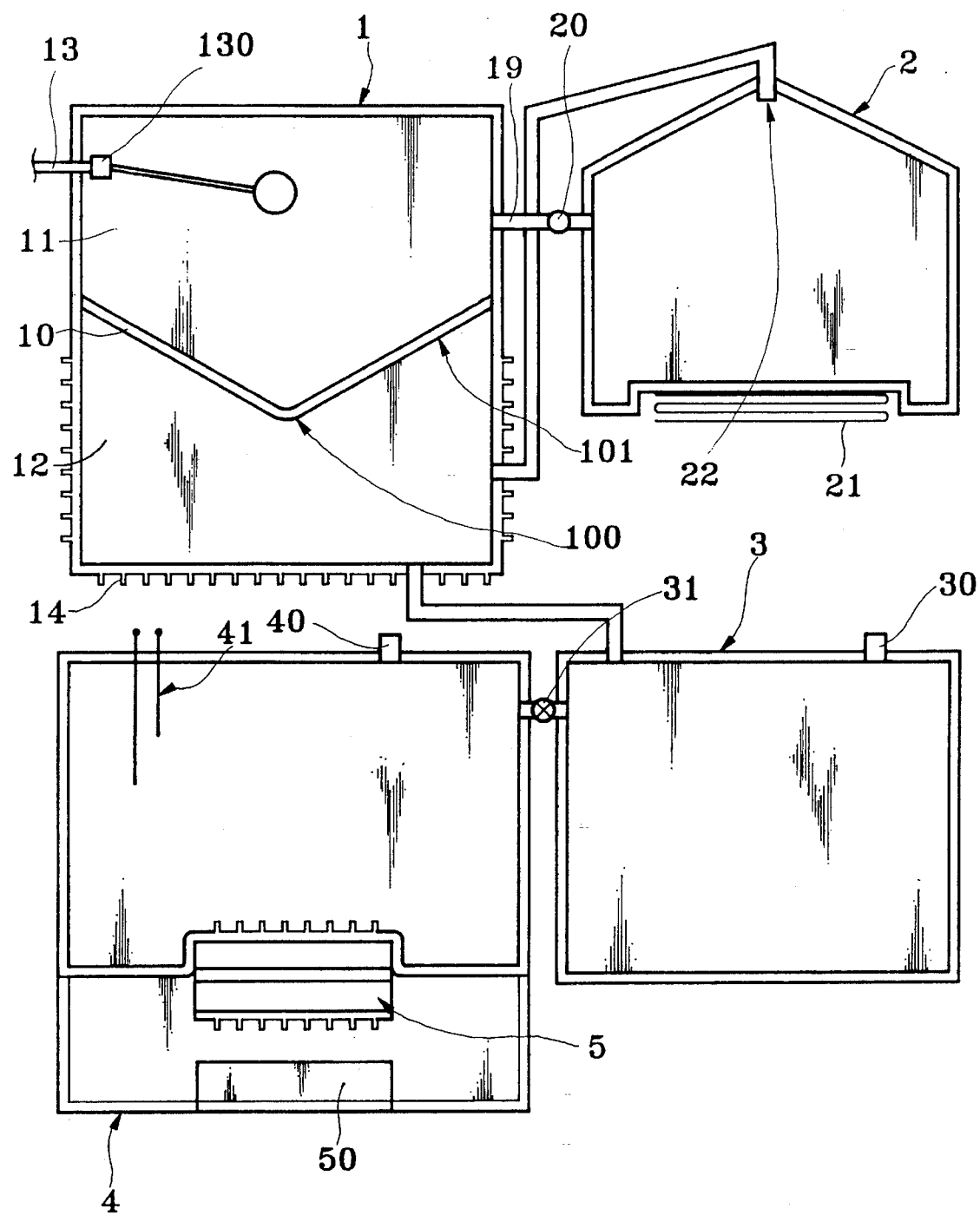
FIG. 1 is a plain view of a distilling apparatus according to the present invention.

Referring to FIG. 1, a distilling apparatus in accordance with the present invention is generally comprised of a condensing chamber 1, a heating chamber 2 disposed at one side by the condensing chamber 1, a hot water chamber 3 and a cold water chamber 4 respectively disposed at an elevation below the condensing chamber 1.

The condensing chamber 1 is a water-tight container. The inside space of the condensing chamber 1 is divided partition wall 10 into two independent holding spaces, namely, the upper holding space 11 and the lower holding space 12. The partition wall 10 has a drip end 100 at the lowest point, and at least one slope 101 extended upwards from the drip end 100 to the periphery of the condensing chamber 1. Therefore, steam can be condensed into water at the at least slope 101 and then gathered at the drip end 100, so that condensed water drip from the drip end 100 to the lower holding space 12. When steam is condensed in the lower holding space 12, a heat exchanging process occurs to pre-heat water in the upper holding space 11, and therefore water which is guided from the upper holding space 11 to the heating chamber 2 can be quickly boiled. The condensing chamber 1 further comprises a plurality of radiating fins 14 mounted on the outside wall of the lower holding space 12 for dissipating heat from the lower holding space 12.

The aforesaid upper holding space 11 has a water inlet 13 connected to an external water source (city water supply system) and controlled by a float switch 130, and a water outlet 19 disposed at a lower elevation than the water inlet 13 and connected to the heating chamber 2 and controlled by a check valve 20. The float switch 130 stops water from entering the upper holding chamber 11 when the water level inside the upper holding chamber 11 reaches the elevation of the water inlet 13. The check valve 20 stops reverse flow of water from the heating chamber 2 to the condensing chamber 1.

The heating chamber 2 comprises an electric heating element 21 controlled to heat water in the heating chamber 2, a steam outlet 22 connected to the lower holding space 12 of the condensing chamber 1 for guiding steam from the heating chamber 2 to the lower holding space 12 of the condensing chamber 1, at which steam is condensed into into water. Condensed water is gathered in the lower holding space 12 and then guided to the hot water chamber 3. The heating chamber 2 is also a water-tight chamber so that steam can be fully guided from the steam outlet 22 into the lower holding space 12 of the condensing chamber 1. The hot water chamber 3 has a relief port 30 at the top side for releasing steam pressure. A whistle (not shown) may be installed in the relief port 30 to make a sharp sound when air passes out of the relief port 30. The installation of the whistle keeps the heating chamber 2 maintained at a slightly high pressure condition so that the heating efficiency can be relatively improved. The check valve 20 automatically opens the water outlet 29 for permitting water to flow from the upper holding space 11 of the condensing chamber 1 into the heating chamber 2 when the steam pressure in the heating chamber 2 drops below a predetermined value. The check valve 20 can also stop water from entering the heating chamber 2 when the water in the heating chamber 2 reaches the full water level. Therefore, water is prohibited from entering the steam outlet 22. The maximum volume of the heating chamber 2 is preferably smaller than that of the hot water chamber 3 so that distilled water does not flow over the relief port 30.

The hot water chamber 3 is communicated with the cold water chamber 4 by a normal-open electromagnetic valve 31. The normal-open electromagnetic valve 31 is disposed at a high water level position. Through the electromagnetic valve 31, distilled water flows from the hot water chamber 3 into the cold water chamber 4. The cold water chamber 4 has an air hole 40 at the top communicated with the atmosphere. There is an electronic cooler 5 mounted on the bottom side of the cold water chamber 4 and operated to cool down distilled water, and a fan 50 disposed adjacent to the hot side of the electronic cooler 5 and controlled to expel hot air to the atmosphere. A temperature control switch may be installed for controlling the operation of the electronic cooler 5.

Figure 2:
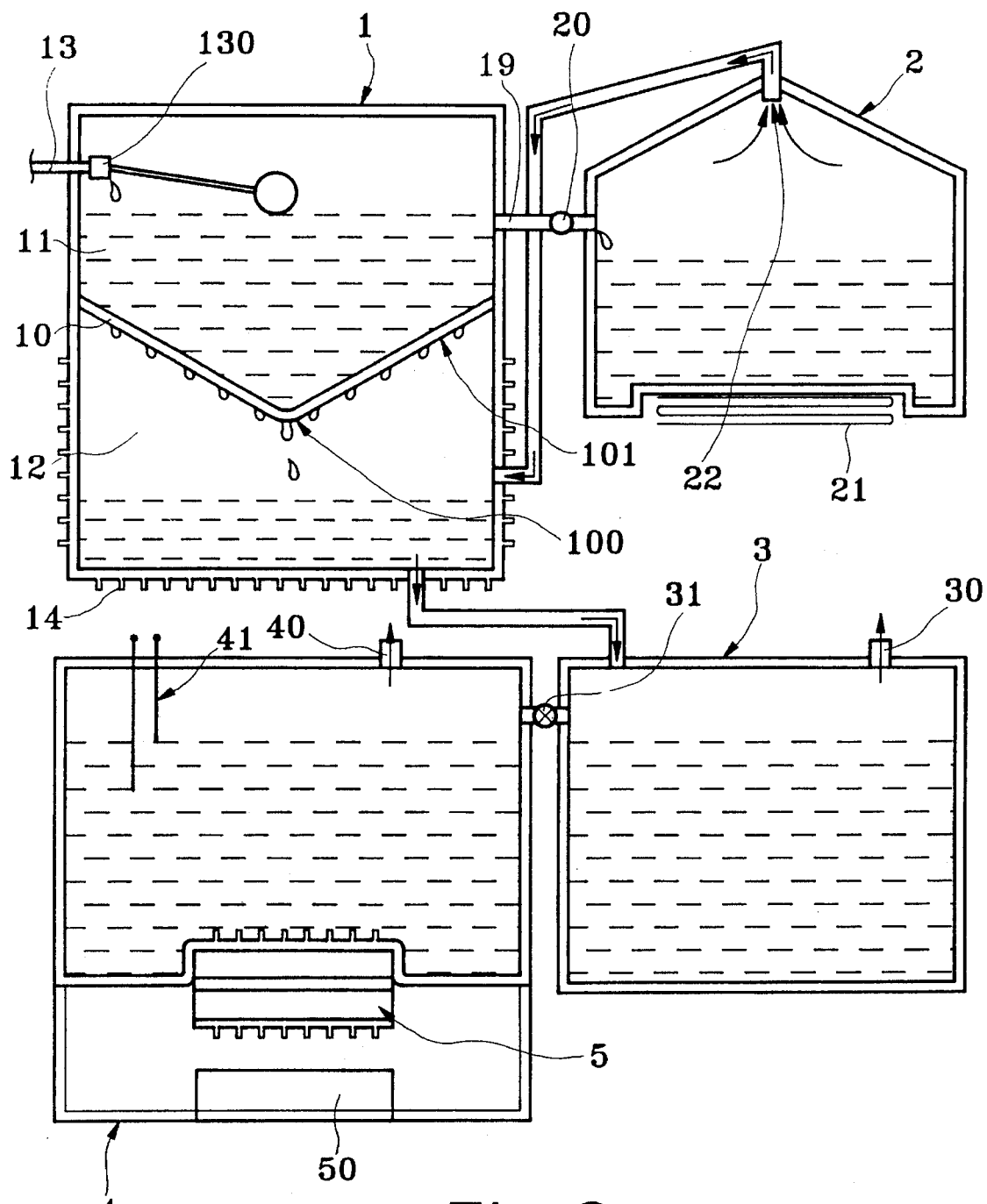
FIG. 2 shows the distilling apparatus of FIG. 1 operated.

The aforesaid cold water chamber 4 further comprises a set of water level probes 41 connected to a control circuit (not shown). When the water level of the cold water chamber 4 reaches a predetermined; range slightly lower than the elevation of the normal-open electromagnetic valve 31, the electromagnetic valve 31 is closed to stop water from entering the cold water chamber 4, and at the same time the water level probes 41 give a signal to cut off power supply from the electric heating element 21. When the electric heating element 21 is turned off, the heating chamber 2 stops from generating steam, therefore no excessive distilled water will flow into the hot water chamber 3. The relative water levels in all chambers of the distilling apparatus are shown in FIG. 2.

When to sterilize the distilling apparatus, a small amount of water is filled through the upper holding space 11 of the condensing chamber 1 into the heating chamber 2, and then the heating chamber 2 is heated to generate steam, permitting steam to fill up the lower holding space 12 and the hot water chamber 3 so as to sterilize the inside of the apparatus.

It is to be understood that the drawings are designed for purposes of illustration only, and are not intended as a definition of the limits and scope of the invention disclosed.

I claim:

1. A distilling apparatus for distillation of water, comprising:

a condensing chamber defining an upper holding space and a lower holding space, said upper holding space comprising a water inlet connected to a water source, a float switch installed in said water inlet to open said water inlet when the water level in said upper holding space drops below a predetermined value or to close said water inlet:when the water level in said upper holding space surpasses a predetermined value, a water outlet disposed at a lower elevation than said water inlet, and a check valve installed in said water outlet for allowing water to flow out of said upper holding space through said water outlet;

a heating chamber disposed at one side by said condensing chamber to receive water from said check valve, said heating chamber comprising an electric heating element at a bottom side thereof controlled to heat water to the boiling point, and a steam outlet at a top side thereof connected to said lower holding space of said condensing chamber for allowing steam to be condensed into water in said condensing chamber;

a hot water chamber connected to said lower holding space of said condensing chamber to collect condensed water from said lower holding space, the holding space of said hot water chamber being bigger than that of said heating chamber, said hot water, chamber comprising a relief port communicated with the atmosphere, and a normal-open electromagnetic valve at one side for allowing water to flow out of said hot water chamber when water inside said hot water chamber reaches a predetermined full water level; and a cold water chamber connected to said hot water chamber to receive water from said electromagnetic valve, said cold water chamber comprising an air hole at a top side thereof communicated with the atmosphere, and a water level detecting means for detecting the water level inside said cold water chamber, said water level detecting means closing said normal-open electromagnetic valve and turning off said electric heating element when water in said cold water chamber reaches a predetermined full water level.

2. The distilling apparatus of claim 1 wherein said condensing chamber comprises a partition wall, which separates said upper holding space from said lower holding space, said partition wall having a drip end at the lowest point, and at least one slope extended upwards from said drip end to the periphery of said condensing chamber.

3. The distilling apparatus of claim 1 wherein said relief port of said hot water chamber is mounted with a whistle.

\* \* \* \* \*